(No Model.) 3 Sheets—Sheet 1.
E. ANDREWS.
ANIMAL TRAP.

No. 539,020. Patented May 14, 1895.

WITNESSES:
John Andrews
John L. Jenks

INVENTOR.
Edgar Andrews,
BY Wm D. McCoy.
ATTORNEY.

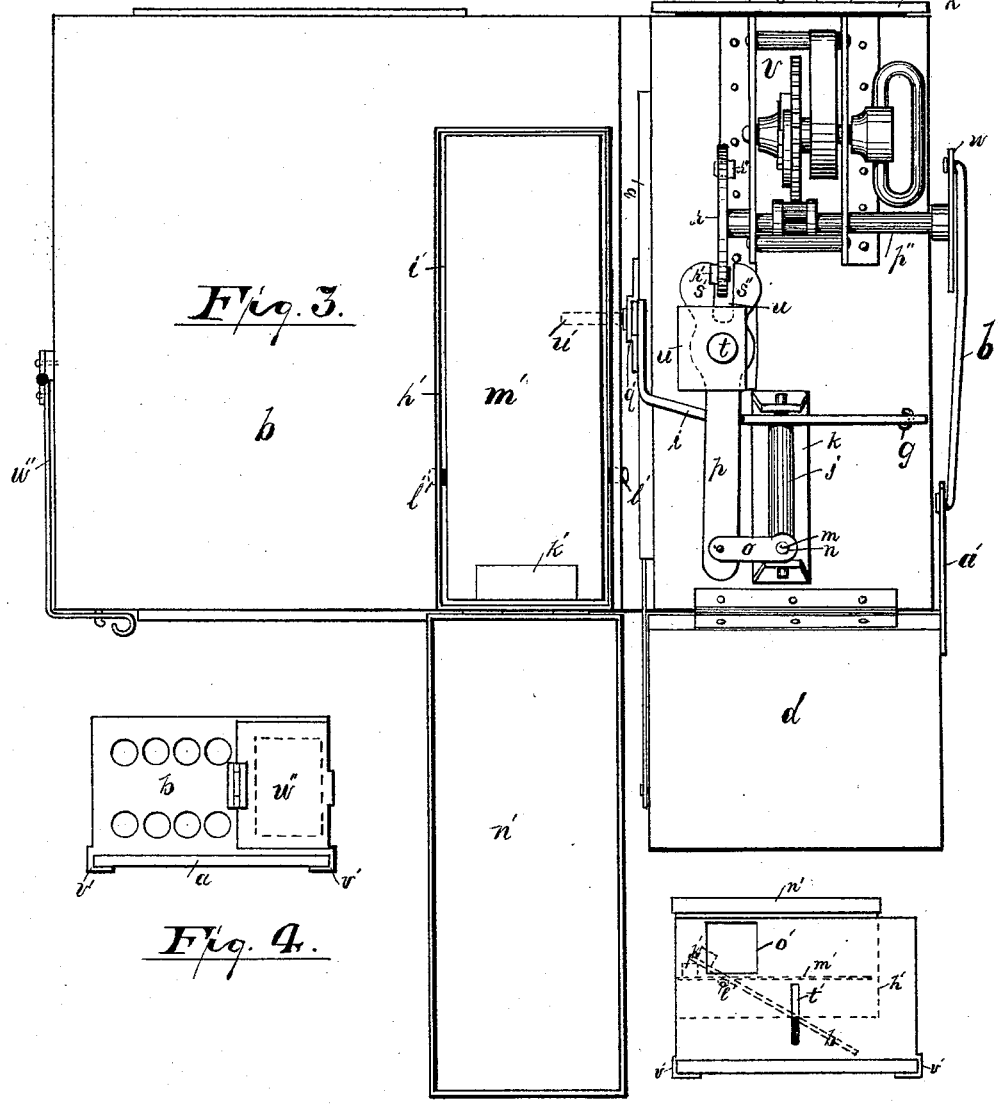

(No Model.) 3 Sheets—Sheet 3.
E. ANDREWS.
ANIMAL TRAP.

No. 539,020. Patented May 14, 1895.

Witnesses:
John Andrews
John L. Jenks

Inventor:
Edgar Andrews
by Wm D. McCoy
atty.

United States Patent Office.

EDGAR ANDREWS, OF BONANZA, TERRITORY OF NEW MEXICO, ASSIGNOR OF ONE-HALF TO JOHN ANDREWS, OF SAME PLACE.

ANIMAL-TRAP.

SPECIFICATION forming part of Letters Patent No. 539,020, dated May 14, 1895.

Application filed June 20, 1894. Serial No. 515,167. (No model.)

*To all whom it may concern:*

Be it known that I, EDGAR ANDREWS, a citizen of the United States, and a resident of Bonanza, in the county of Santa Fé and Territory of New Mexico, have invented certain new and useful Improvements in Animal-Traps, of which the following is a specification.

My invention relates to improvements in animal traps in which tilting platforms operate in conjunction with a motor to effect the opening and closing of the trap; and the object of the invention is to provide means for attracting the animals and to effect through their entrance into the trap a resetting of the same and to secure other advantages and results some of which will be more fully referred to in connection with the description of the working parts.

Figure 1:
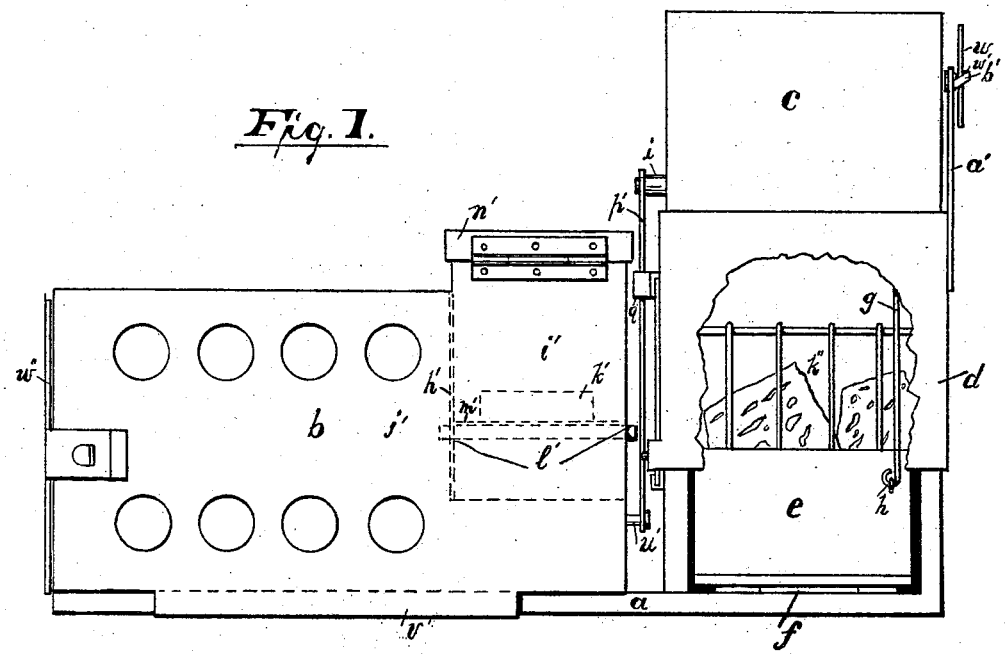
Figure 2:
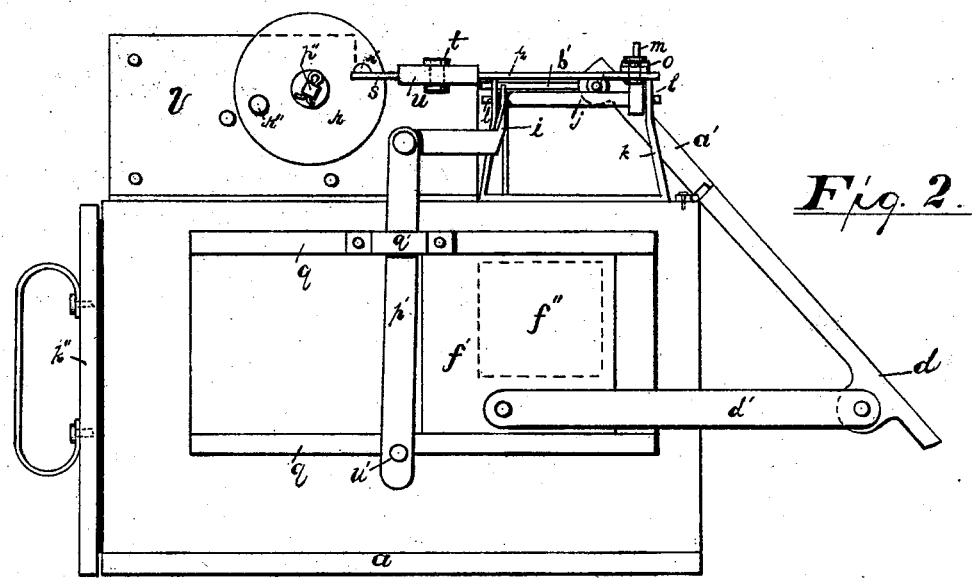
Figure 6:
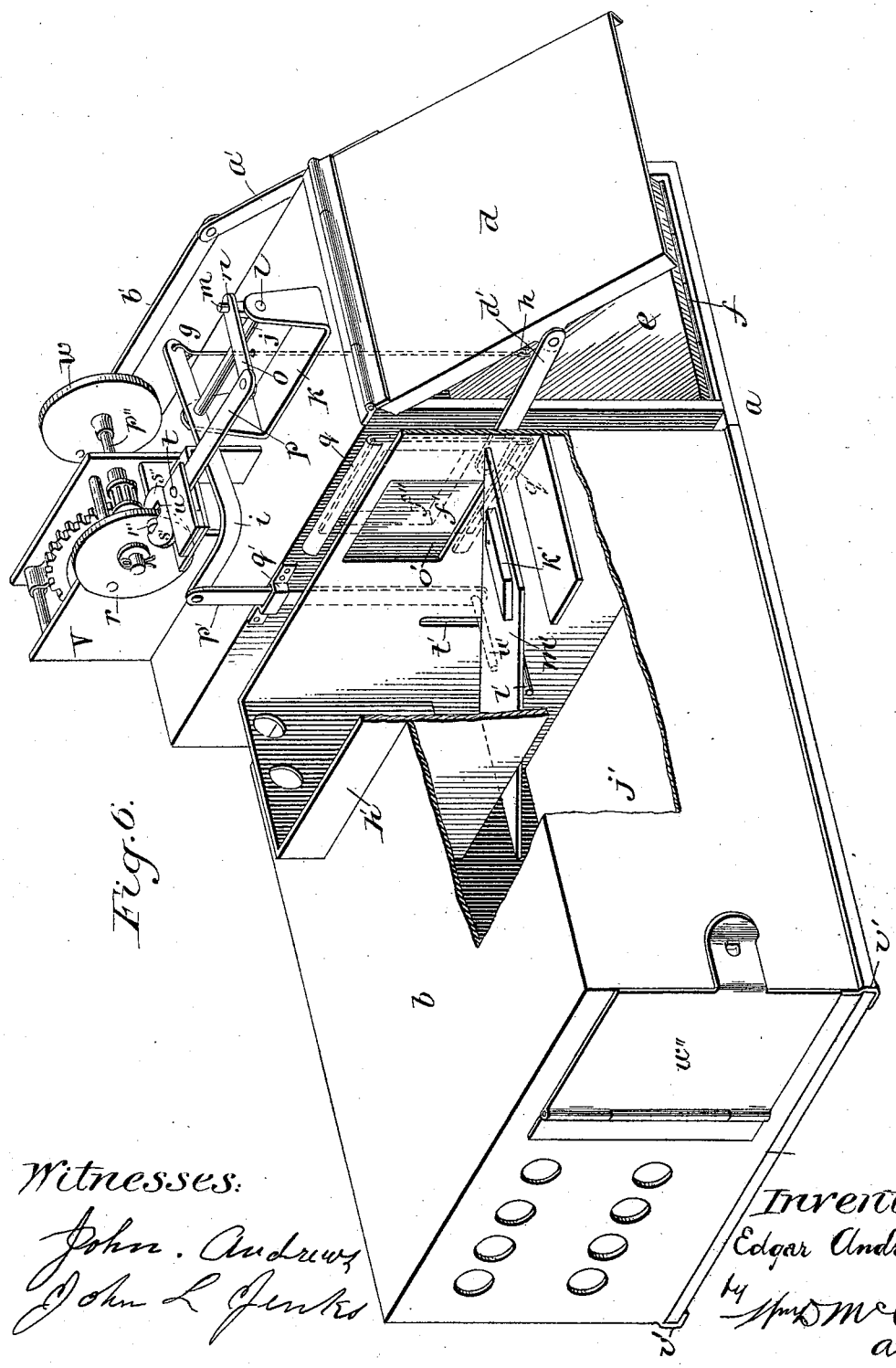

In the accompanying drawings, in which similar symbols of reference indicate similar parts throughout the several views, Figure 1 is a front elevation of my improved trap with a portion of the door broken away to more clearly show a portion of the mechanism. Fig. 2 is a side elevation of the same with detachable chamber portion of the trap and the motor-case removed. Fig. 3 is a plan view of my trap with the motor-case removed. Fig. 4 is a side elevation of the detachable chamber on a reduced scale, and Fig. 5 is a side elevation of the same from the opposite side shown in Fig. 4. Fig. 6 is a front perspective view with the lid N' off, with parts in broken section.

It will be understood that the trap is composed of two main parts; a detachable receiving chamber, and an entrance portion with attached motor mechanism, and in the said drawings $a$, represents the platform or base of the trap; $b$, the detachable chamber for confining the animals; $c$, the motor case, and $d$ the door of the trap. A platform $e$ is secured to the base $a$ by a hinge $f$ and said platform is held in an inclined position by means of the rod $g$ loosely connected to $e$ at $h$. The upper end of the rod $g$ is loosely jointed to the oscillating arm $i$ and said arm is secured to a rocking shaft $j$ the latter being supported by a bracket $k$ providing bearings for $j$ at $l, l$. To the rocking shaft $j$ is secured an upwardly projecting pin $m$ which enters an opening $n$ in the connecting rod $o$. The rod $o$ is pivotally connected to the forward end of a detent $p$ which latter is slotted at its rearward end, at $q$ to admit the wheel or disk $r$ between the lips $s'$ $s''$ thereof. The detent $p$ is held in proper relation by means of the pivot pin $t$ connecting the detent to the support $u$, Figs. 2, 3 and 6. A motor V, consisting of the ordinary clock spring, gearing, ratchet and winder, effects the rotation of the disks or wheels $r$ and $w$ carried on the geared shaft $p''$ all of which will be understood by reference to Figs. 3 and 6. The disk $r$ is provided with lugs $r'$ $r''$ arranged on opposite sides thereof and on the same diametrical line. A crank rod $b'$ connects the wheel $w$ with the upwardly projecting arm $a'$ of the door $d$.

The relation of the lugs $r'$ $r''$ to the lips $s'$ $s''$ of the detent $p$ is such that when the rocking shaft $j$ is operated and the detent $p$ is turned on its pivotal bearing $t$ by means of the connecting rod $o$, the lug on the disk $r$ in engagement with one of the lips of the detent $p$ will thus be released from engagement therewith and admit of a rotary movement of the disk $r$ by means of the motor $v$. The movement of the detent $p$ having thrown the opposite lip thereof in the path of the opposite lug on the disk $r$, but one half revolution of the disk $r$, is effected, upon operating the detent $p$ as described.

To the lower part of the door $d$ is pivotally secured a rod $d'$, said rod being pivotally secured at its rearward end to a slide door $f'$ covering the opening $f''$. Shown in dotted lines Figs. 2 and 6. Guides $q$ secure an easy movement of door $f'$ in a horizontal direction. By these means it will be understood that the opening of the door $f'$ is effected upon the closing of the door $d$, and conversely.

In the chamber $b$ is a partition $h'$, shown in dotted lines, Figs. 1 and 5, and in full in Fig. 6, partially separating portion $i'$ from $j'$. A tilting platform $m'$ pivoted at $l'$ and held in normal horizontal position by the weight $k'$ operates in the portion $i'$. The partition $h'$ does not reach to the bottom of chamber $b'$ but is of such height above it as will admit of the entrance of an animal from $i'$ into $j'$ when the platform $m'$ is tilted by the weight of an animal to the inclined position shown in broken lines, Figs. 5 and 6. The cover $n'$ provides an easy means of adjusting parts of mechanism. An entrance way $o$ in part $b$ Figs. 5 and 6 is opposite the opening $f''$, when the chamber $b$, is in its normal position on the base $a$, and affords a continuous opening from the entrance chamber to the chamber $b$ when the door $f'$ is open.

A rod $p'$ loosely connected at its upper end to the oscillating arm $i$ travels in guides $q'$ $q'$ and at its lower end is provided with a short projecting piece $u'$ running at right angles from the rod $p'$ and is normally under the platform $m'$ but not in contact therewith. An elongated opening $t'$ provides for an upward and downward movement of the piece $n'$.

At the bottom of the chamber $b$, are guides $v'$, $v'$ which overlap the base $a$, and there being no rigid connection between the chamber $b$ and the remainder of the trap, the removal of this chamber with the imprisoned animals may be effected by simply sliding it off from the base $a$, as will be understood on reference to Figs. 4 and 5. The whole chamber may then be submerged in water and the animals removed through the door $w''$.

A removable bait box $k'''$ is inserted as a drawer in the entrance chamber and may be slid in proper position at the rear of the tilting platform $e$.

The trap described is more particularly adapted to mice but variations as to dimensions and a simple modification of parts will adapt my trap to other animals than mice.

Having described the working parts, the operation of my improved trap is as follows: I have availed myself of the practice of wild animals to move from cover to cover, and placed the door $d$, in a slanting or inclined position so as to partially cover the entrance to the trap. A mouse moving about seeks the shelter thus afforded and is then attracted by the bait, so conveniently near, steps on the platform $e$ and instantly shifts the detent by means of its connection with the platform through the rod $g$, oscillating arm $i$, rocking shaft $j$ and connecting rod $o$, thus effecting a release of the lug $r'$ on the wheel $r$, and causing a rotary movement of the latter by reason of the wound spring of the motor $v$, until lug $r''$ engages the lip $s''$ of the detent, after one half revolution of the wheel $r$ and shaft $p''$ is effected, and the closing of the door $d$, and the opening of the door $f'$ as will be understood. The affrighted animal finds an exit through the opening $f''$ into $i'$, steps on the tilting platform $m'$ throwing the same down on the projecting lug $u'$ of the rod $p'$ and depressing the same and the oscillating arm $i$, and the latter by reason of its connection with the rocking shaft causes the detent $p$ to disengage the lug $r''$ of the disk $r$ admitting of another half revolution of the shaft $p'$ and the opening of the door $d$ and the closing of the opening $f''$ as will be understood. The platform $m'$ being relieved of the weight of the animal, which passes into the chamber $b$, is restored to its normal position by the weight $k'$. The trap is again set and the mouse imprisoned.

Having thus described my invention, what I claim as new is—

1. The combination in a trap with a motor $v$ of a rocking shaft $j$, having a connection with a detent $p$, and carrying an oscillating arm $i$, said arm having a connection $p'$, with a tilting platform $m'$, and a connection $g$, with a tilting platform $e$, whereby when either of said platforms is tilted said detent is operated to release said motor, substantially as and for the purpose set forth.

2. In a trap the combination with a motor and door of a detent $p$, having lips $s'$ $s''$, a wheel $r$, having lugs $r'$ $r''$ and having connections with said motor, a platform $e$ having connections with said detent and said motor whereby when said platform is tilted said motor effects the closing of said door, substantially as described.

3. In combination in a trap, an entrance chamber and a confining chamber each having a door, a motor having connections with said doors, a platform $e$ having connections with said motor whereby when said platform is tilted said motor effects the closing of the entrance chamber door and the opening of the confining chamber door, substantially as and for the purpose set forth.

4. In combination in a trap with an entrance chamber and a confining chamber each containing a tilting platform and each having a door, of a motor and detent having connections with said platform and said door, whereby when the first of said platforms is depressed the said entrance chamber door is closed and said confining chamber door is opened, and when the second of said platforms is depressed the said entrance chamber door is opened and said confining chamber door is closed, substantially as and for the purpose set forth.

Signed at Cerrillos, in the county of Santa Fé and Territory of New Mexico, this 15th day of June, A. D. 1894.

EDGAR ANDREWS.

Witnesses:
ADAM E. LAUDENSLAGER,
A. L. KENDALL.